Figure 1:
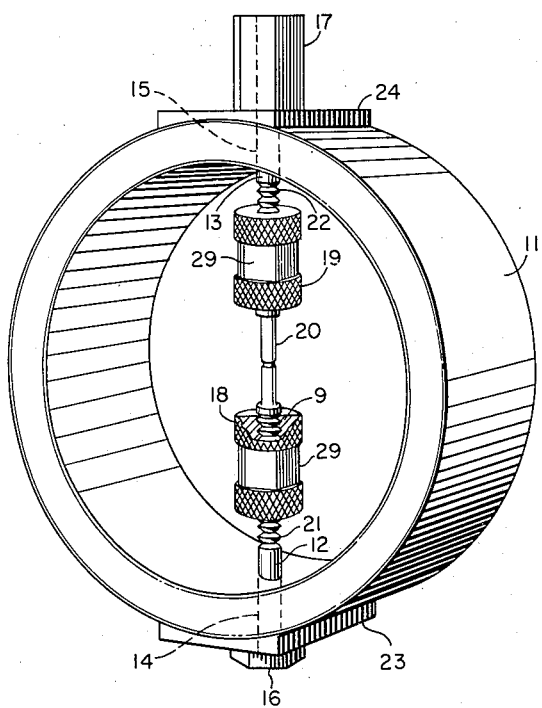

April 22, 1958 R. H. RARING ET AL 2,831,343
LOAD APPLYING ELASTIC RING
Filed Oct. 29, 1956 3 Sheets-Sheet 1

INVENTORS
RICHARD H. RARING
JOHN A. RINEBOLT
GEORGE L. GREGG

BY

ATTORNEYS

April 22, 1958 R. H. RARING ET AL 2,831,343
LOAD APPLYING ELASTIC RING
Filed Oct. 29, 1956 3 Sheets-Sheet 2
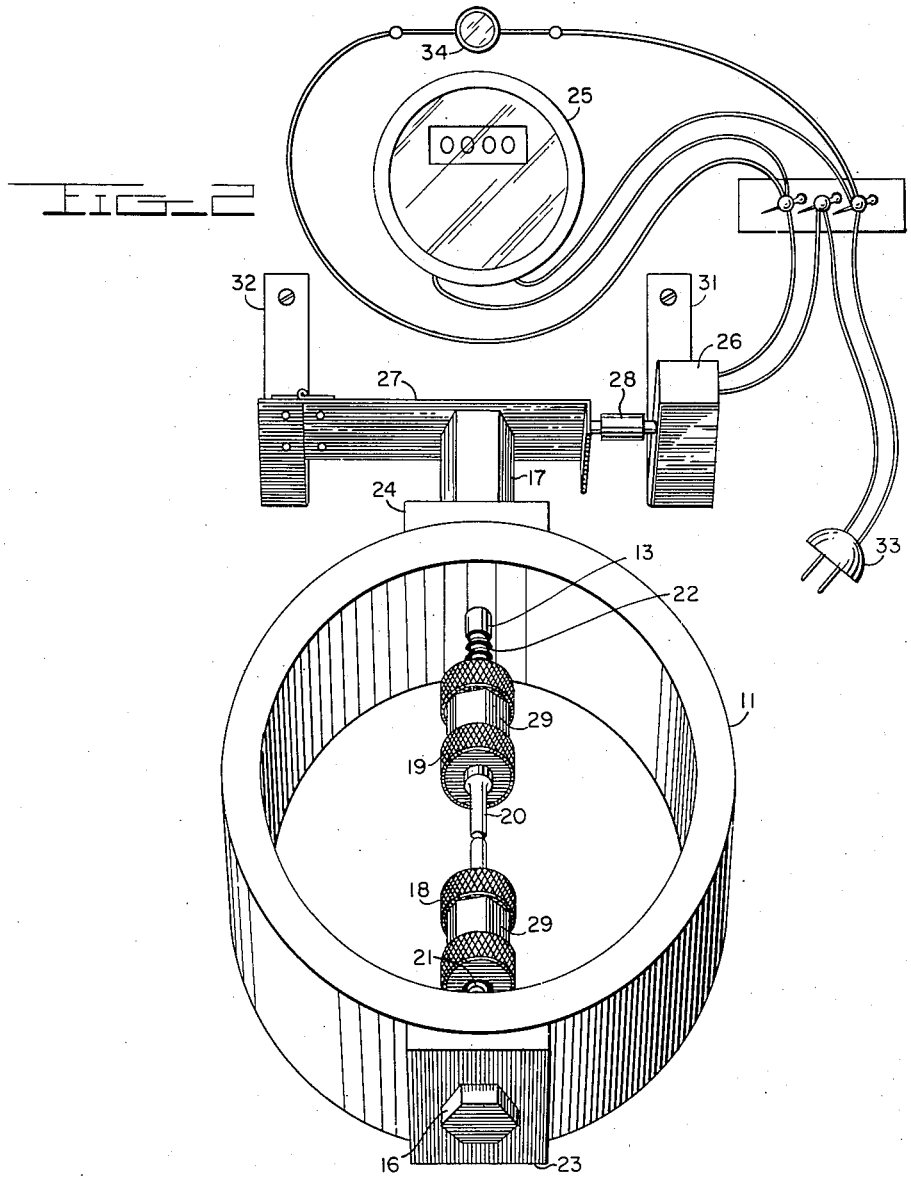
INVENTORS
RICHARD H. RARING
JOHN A. RINEBOLT
GEORGE L. GREGG
BY
ATTORNEYS

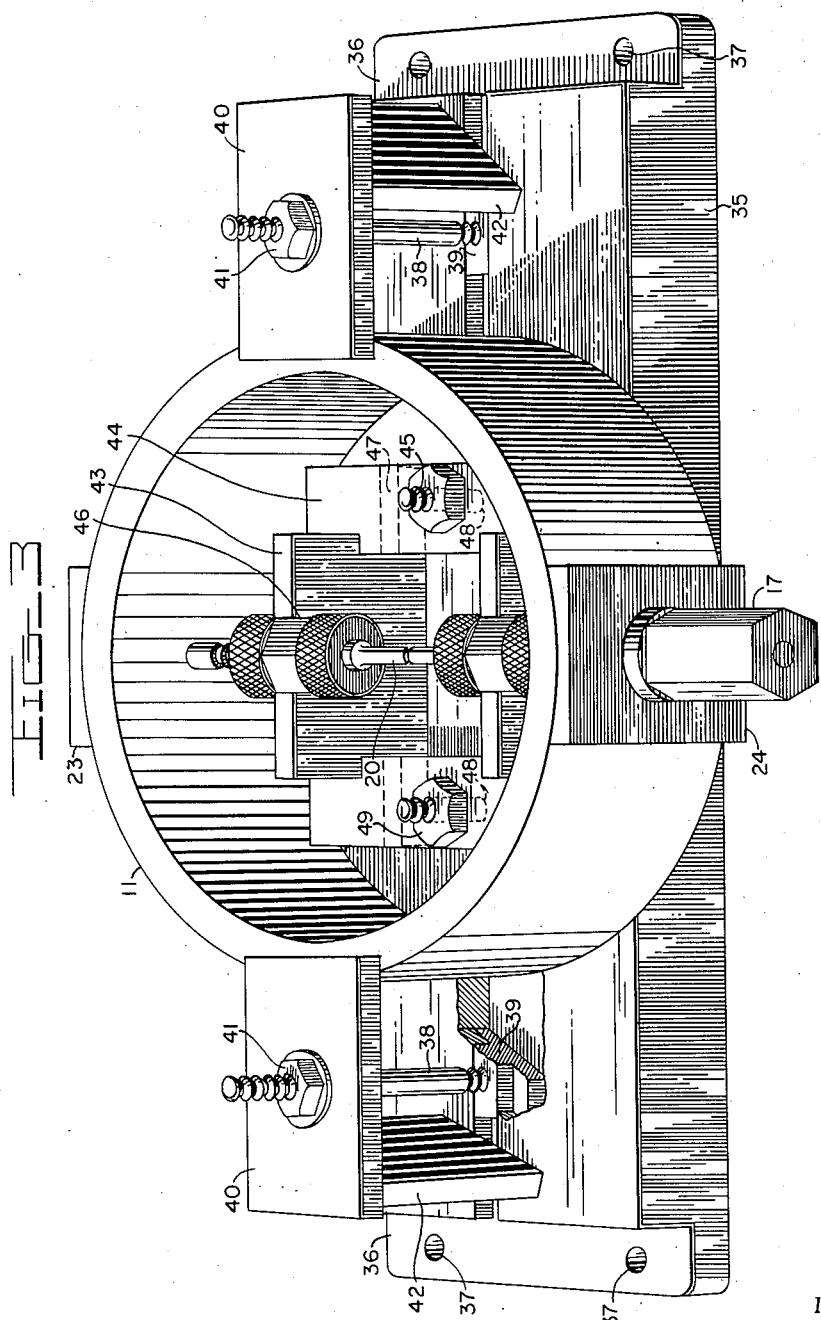

2,831,343

LOAD APPLYING ELASTIC RING

Richard H. Raring, Washington, D. C., John A. Rinebolt, Canton, Ohio, and George L. Gregg, Washington, D. C.

Application October 29, 1956, Serial No. 619,091

3 Claims. (Cl. 73—95)

(Granted under Title 35, U. S. Code (1952), sec. 266)

The invention described herein may be manufactured and used by or for the Government of the United States of America for governmental purposes without the payment of any royalties thereon or therefor.

The present invention relates to static fatigue testing of materials and more particularly to a device for applying and maintaining a constant tensile load on a test specimen.

It is a highly desirable matter that constructional steels be tested at strength levels of 200,000 to 300,000 pounds per square inch for sustained load failure. This requires the testing of a large number of specimens for a long period of time. The use of large expensive testing machines, such as a universal testing machine, for a general testing program of this kind is not economically practical in view of the time consuming nature of the test and the space occupied by the machines.

It is therefore an object of the present invention to provide a device for sustained load testing which is small and inexpensive and useful as an instrument for static fatigue testing of high strength steels on a general testing program basis.

It is another object to provide a device of this kind which includes a simple means for applying test loads on a specimen.

Other objects of the invention will become apparent from the following description taken in conjunction with the accompanying drawings in which like numerals indicate like parts.

Fig. 1 shows by way of illustration a view in perspective of a preferred embodiment of the new testing device of the invention, Fig. 2 illustrates a loaded testing ring positioned in combination with a switch control timer, and Fig. 3 illustrates a view in perspective of a load applying holding device shown with a testing ring positioned therein for applying a test load to a specimen.

The testing device of the invention comprises an elastic ring capable of exerting a constant tension load on a specimen mounted therein, means for holding the specimen within the ring under the applied load and means for applying the test load to the ring. A timing means is arranged to record the length of time to fracture the specimen. The device including the timing means is a compact assembly which can be operated for testing on a single or multiple unit basis.

Referring to Fig. 1 of the drawings wherein a preferred embodiment of the new testing device is shown, an elastic steel ring 11 is provided with a test load applying means which is supported in the ring by means of a pair of bolts 12 and 13 which pass through respective openings 14 and 15 in the ring which are aligned on a diameter thereof. Bolt 12 is provided with a fixed head 16, whereas bolt 13 is threaded to carry a load applying head or nut 17, the inner end of each of the bolts 12 and 13 is threaded to carry respectively holding means or grips 18 and 19 which are threaded on opposite ends thereof to receive bolts 12 and 13 and to secure therebetween a specimen 20 to be tested. Grip 18 has been cut away at 9 to illustrate the threaded connection between the grips and the specimen. The bolts 12 and 13 are oppositely threaded, one being provided with a left hand thread 21 and the other with a right hand thread 22 in order to prevent torque on the specimen when the tension is applied to the specimen by tightening nut 17. To distribute the load applied to the ring by means of the loading head or nut 17, a plate 23 is located between the fixed head 16 and the ring and a plate 24 is located between the movable head or nut 17 and the ring, the plates being of mild steel and provided with an opening for passage of the respective bolts therethrough. By tightening nut 17, the ring is placed in compression which places tension on the specimen held by the grips 18 and 19.

Suitable stock for the elastic ring is chrome steel SAE 52100 tubing (1.30–1.60 chromium and 0.95–1.10 carbon), oil quenched and tempered to a hardness of about Rockwell C 43. Rings machined from this stock maintain proper load tensions and show no significant change in the no load reading after substantial use, for example, 3000 hours and more.

A timer unit (shown in Fig. 2) may be associated with the elastic steel ring to indicate the time that it takes for testing. The unit comprises an elapsed time indicator 25 controlled by a normally open microswitch 26 secured to a bracket 31 and held in its on position by a lever 27 which is pivotally secured to a bracket 32 and suitably positioned with respect to the switch control 28. A source of current is supplied to the timer through use of a plug-in 33 and appropriate wires from the source to the switch and the timer. A light 34 is connected in parallel with the timer unit to indicate whether or not the timer is in operation.

Fig. 3 illustrates a device for holding the testing ring during loading, that is, applying the desired tension on the test specimen. The device includes a rectangular base plate 35 of suitable thickness which is cut down on the ends thereof to provide extending end portions 36 which have holes 37 therein for securing the base plate to a work bench. The upper portion of the base plate is longitudinally cut way across the middle thereof to form a T-slot. The T-slot provides a track along which suitable testing ring hold down members and grip holding shackles may be secured for linear adjustment. The base plate has been cut away to illustrate the T-slot and a special nut 39. The tension ring hold down members include studs 38 each having one end screwed into special nut 39 formed to fit within and to slide along the T-slot and the other end passes through steel plate 40 and has a nut screwed onto the end thereof above the plate. The plate 40 has an associated upright standard 42 which balances one end thereof as the opposite end is positioned on the edge of a ring to hold the ring in loading position. The upright standards 42 are of the same height as the ring and are shown in a sidewise position to indicate the width thereof. In order to prevent torque on the test specimen by rotation of the specimen holding grips during loading, the specimen holding grips have a hexagon shaped portion 29 on the outer surface thereof which fits into the grip holding shackles. The grip holding shackles include upright plates 43 and cross members 44 which are secured to the base by studs 45. The upright plates have a centrally disposed U-shape 46 cut into the upper surface for receiving the grip holders, and shoulders 47 on the opposite end thereof upon which the cross members 44 are positioned. The cross members hold the upright plates 43 in position for holding the specimen holding grips within the U-shaped cutout. Studs 45 have one end that screws into a special T-nut positioned in the T-slot and the other end passes through a centrally disposed hole 48 in the cross members and has a nut 49 screwed onto the outer end thereof for applying pressure to the cross members.

In operation of the device test specimen 20 is secured in the specimen holders or grips 18 and 19 and the grips with the specimen therein is positioned within the ring and the bolts 12 and 13 are inserted through the holes in the ring and screwed into respective ends of the specimen holders, then the tension ring is secured in the loading device. The hexagon portions of the grips are positioned in the U-shaped cutouts in uprights 43 and the nuts 49 are tightened against the cross members 44 to hold the upright 43 in position. The steel plate 40 is positioned with one end on the ring, and with the upright standards 42 positioned under the other end of the plate, the plate secures the ring in the device by tightening nuts 41. The nuts 41 should not be secured too tightly because the plate 35 may restrict the ring against compression. After the ring has been properly secured in the loading device, nut 17 is tightened against the plate 24 forcing bolt head 16 against the plate 23 to compress the steel ring and apply tension on the test specimen by the steel ring forcing against the nut 17 and bolt head 16. At the same time that the nut is tightened to compress the ring, the inside diameter of the ring along the specimen is measured to determine the displacement of the ring across its diameter. This measure determines the load that is applied to the ring as determined by the calibration factor of the ring and can be measured by any well known means but for simplification of instruments it has been determined that an inside micrometer gives excellent results. To aid in allowing a more precise measurement of the inside diameter of the ring during tightening nut 17, bolt 13 has micrometer threads on the nut end. This permits the nut to move only a short distance for each revolution thereby allowing a more accurate reading for the amount of deflection of the steel ring. After the ring has been loaded with the proper tension load on the specimen, the ring is removed from the loading device and positioned on a side thereof with the tightening nut 17 juxtaposed the lever 27 which controls the timer unit as shown in Fig. 2. The timer is started by positioning the lever against the normally open microswitch button. When the specimen fractures, the elastic energy stored in the ring suddenly releases, displacing the bolt 13 and nut 17 which forces the lever 27 away from the microswitch button 28 thereby opening the circuit to the timer which records the time that the specimen was under tension.

In application of the load to the specimen in the ring, care must be exercised during tightening nut 17 so that torque will not be induced on the specimen. For this purpose the loading device of Fig. 3 is used, however, the grip holder bolts 12 and 13 have been provided with opposite threads which would permit the specimen to loosen in the grips if the bolts 12 and 13 were to rotate during tightening of nut 17. This feature, in the absence of a holding device, such as in Fig. 3, will enable loading of the ring for test purposes.

The testing load applied is determined by first calibrating the ring to determine the calibration factor which relates the load on the ring to the change in the ring diameter, that is, the number of pounds required to deflect the ring 0.001 inch. This deflection has been found to be essentially constant at deflections of 0.150 inch and less. On the basis of the ring calibration factor, the nut 17 is tightened until the desired load on the specimen has been reached by deflecting the ring until the corresponding proper measurement of the inside diameter of the ring has been reached.

The method used to calibrate the ring, in order to relate to load on the ring to the change in the inside diameter, is to apply specific compression loads in pounds on the ring within a universal testing machine and to measure and record the corresponding inside diameter of the ring for each corresponding known load test. This is representative of the conditions that will be obtained in use by applying a compression load on the ring by the bolt head 16 and the nut 17.

The optimum dimensions of the test ring depend on the load at which it is to be used. At capacity load, a deflection (the change in the inside diameter) of about 0.10 inch to 0.15 inch has been found to be satisfactory, and the dimensions of a ring with this approximate deflection can be estimated from the formula:

$$\delta = 0.149 \frac{PR^3}{EI}$$

where $\delta$ = change in diameter, in.,
$P$ = load, lbs.,
$R$ = radius of center line, in.,
$I$ = moment of inertia of cross section, and
$E$ = Young's Modulus, p. s. i.

This formula assumes a perfect ring. Since the ring of the testing device of the invention has a pair of holes therein to receive the bolts of the specimen holder, the formula is applied as an approximation.

For example, a typical ring for use in the range of 5,000 to 10,000 lbs. has a no-load inside diameter of 6.37 in., an outside diameter of 7.12 in., and a height of 3 in. and a calibration factor of 73.6 lbs. per 0.001 inch deflection of the inside diameter whereas the calculated calibration factor was 69 lbs. per 0.001 inch. Such rings have been used for testing specimens of quenched and tempered AISI steel at room temperature for stresses as high as 75 percent of the breaking strength for times in excess of a month and negligible effect has occurred to the rings, as they maintained a constant calibration factor and the no-load dimensions were the same after completion of the test.

A number of equal or different sized rings having different test specimens can be positioned side by side on a table juxtaposed an associated time control switch and each device will use only a little room. In order to prevent one device from disturbing another during test and especially when a specimen fractures, it is desirable that the units be placed on a cushion such as a rubber sheet wherein vibrations from different devices during fracture will not disturb adjacent devices to bring about a premature fracture.

Since changes or modifications may be made in the invention herein described without departing from the spirit or scope thereof, it is intended that the preferred embodiment of the invention appearing in the above description shall be taken by way of illustration and not in limitation except as may be required by the appended claims.

What is claimed is:

1. A device for static fatigue testing comprising a deformable elastic ring, a pair of bolts passing through and extending into said ring along a diameter thereof, one of said bolts having a head thereon positioned on the outside of sid ring, the other of said bolts having a screw nut threaded thereon on the outside of said ring surface, and specimen holding means carried by the ends of said bolts within said ring.

2. A device for static fatigue testing comprising a deformable elastic steel ring, a pair of threaded loading applying bolts passing through aligned holes in said ring along a diameter thereof and extending with their threaded ends into the ring, specimen holding means carried by each of said bolts and adapted to secure a test specimen within the ends thereof, a bolt head on the outer end of one of said bolts and a nut on the outer end of the other of said bolts adapted to compress said elastic steel ring and produce tension on a specimen carried by said specimen holders when undergoing specimen tests.

3. A static fatigue testing device comprising a deformable elastic ring, a pair of bolts passing into said ring through openings therein along a diameter thereof and supporting a load applying and specimen holding means, one of said bolts being provided with a fixed head on the outer end thereof and the other of said bolts being provided with a threaded load applying nut thereon, each of said bolts being provided with threaded inner ends to carry said specimen holding means within said ring.

References Cited in the file of this patent

UNITED STATES PATENTS

| | | |
|---|---|---|
| 1,888,755 | Barr et al. | Nov. 22, 1932 |
| 2,356,763 | Keinath | Aug. 29, 1944 |
| 2,471,227 | Marshall | May 24, 1949 |